United States Patent [19]
Berkey

[11] Patent Number: 5,236,481
[45] Date of Patent: Aug. 17, 1993

[54] METHOD OF DOPING POROUS GLASS PREFORMS
[75] Inventor: George E. Berkey, Pine City, N.Y.
[73] Assignee: Corning Incorporated, Corning, N.Y.
[21] Appl. No.: 839,915
[22] Filed: Feb. 21, 1992
[51] Int. Cl.⁵ .......................................... C03B 37/014
[52] U.S. Cl. ..................................... 65/3.11; 65/3.12
[58] Field of Search ......................... 65/3.11, 3.12, 900

[56] References Cited
U.S. PATENT DOCUMENTS

| Re. 28,029 | 6/1974 | Keck et al. | 65/3.12 |
|---|---|---|---|
| 3,801,294 | 4/1974 | Schultz | 65/18.2 |
| 3,859,073 | 1/1975 | Schultz | 65/3.12 |
| 3,864,113 | 2/1975 | Dumbaugh et al. | 65/3.12 X |
| 4,217,027 | 8/1980 | MacChesney et al. | 65/3.12 X |
| 4,263,031 | 4/1981 | Schultz | 65/3.12 |
| 4,604,118 | 8/1986 | Bocko et al. | 65/3.12 |
| 4,616,901 | 10/1986 | MacChesney | 65/3.11 X |
| 4,693,738 | 9/1987 | Hoshikawa et al. | 65/3.11 |
| 4,787,927 | 11/1988 | Mears et al. | 65/3.12 |
| 5,055,121 | 10/1991 | Kanamori et al. | 65/3.12 |
| 5,131,936 | 7/1992 | Cognolato et al. | 65/3.12 X |

Primary Examiner—Robert L. Lindsay
Attorney, Agent, or Firm—William J. Simmons, Jr.

[57] ABSTRACT

Disclosed is a method of forming a doped glass article. Heated glass particles are deposited on a mandrel where they adhere together to form a porous glass preform having interconnective pores. The mandrel is removed to form a tubular preform having an axial aperture. The preform is suspended in a consolidation furnace by a gas conducting handle having a dopant containing chamber. As the handle and preform are heated, there is flowed through the chamber a gas that reacts with the heated dopant to form a reactant gas that flows into the aperture and into pores, whereby a dopant is incorporated into the porous glass preform. The doped preform is heat treated to consolidate it into an elongated non-porous glass body containing the dopant. The glass body can be provided with cladding glass and drawn into an optical fiber.

19 Claims, 3 Drawing Sheets

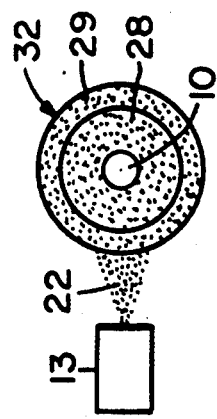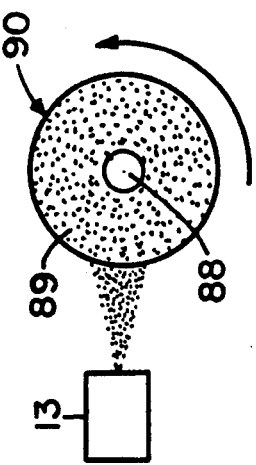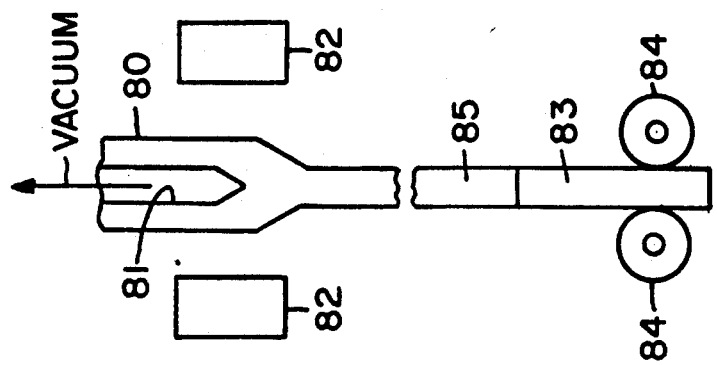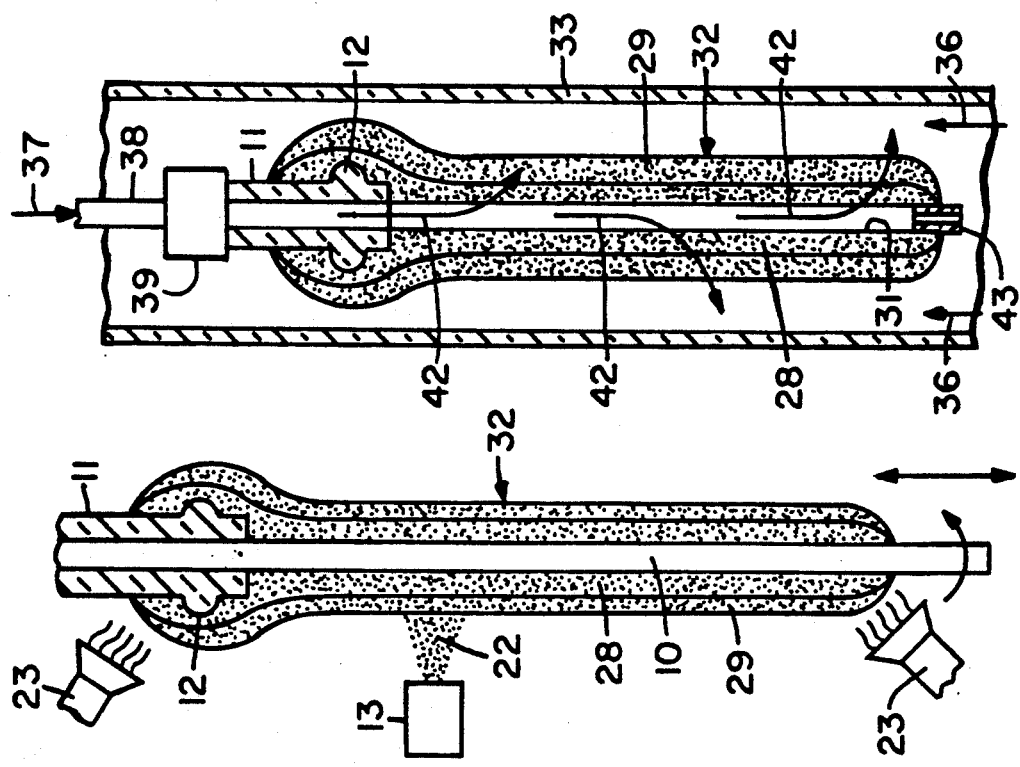

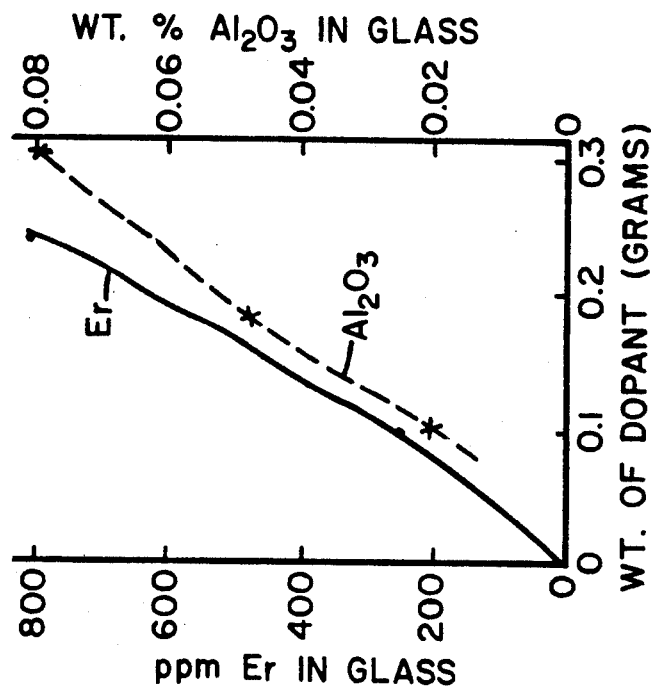
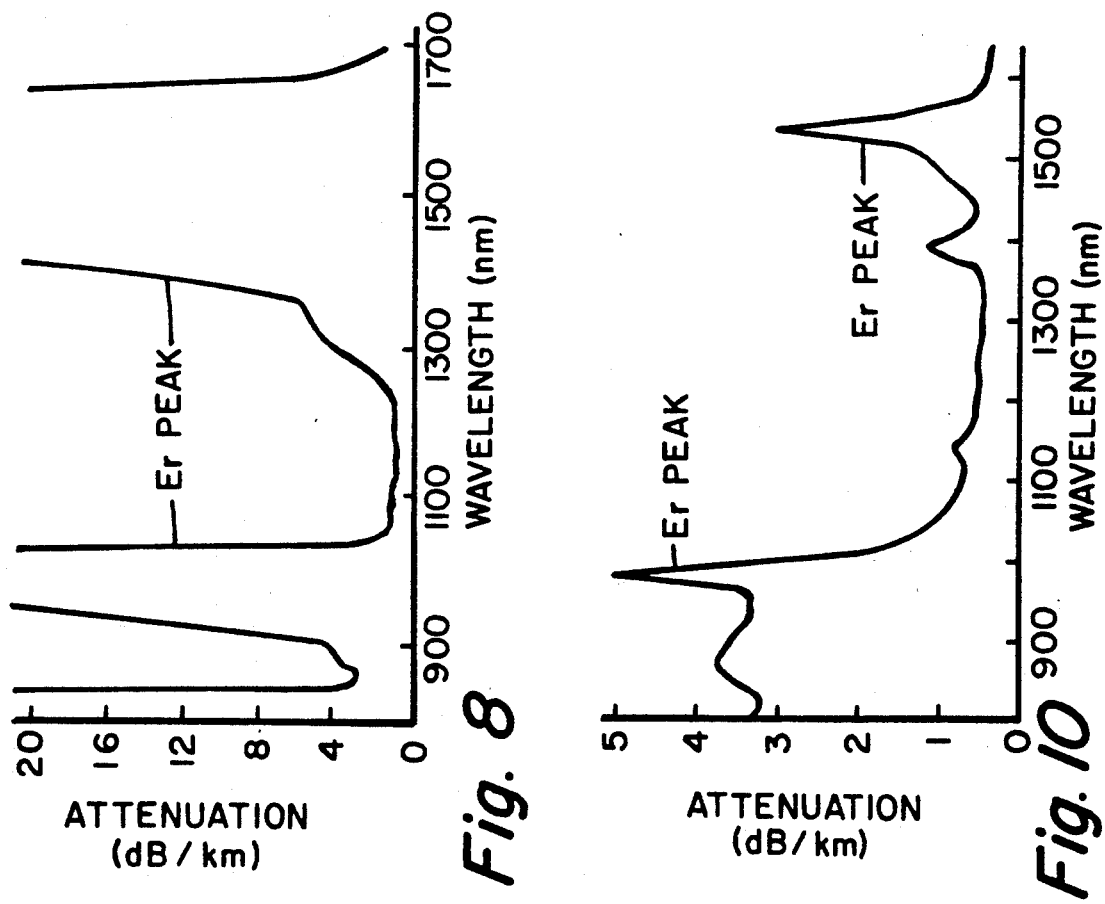

METHOD OF DOPING POROUS GLASS PREFORMS

BACKGROUND OF THE INVENTION

The present invention relates to a method and apparatus for forming optical fiber preforms, especially those preforms that contain dopants that are not readily incorporated during the deposition process.

Optical fibers have been routinely fabricated on a commercial basis with losses less than 1 dB/km in at least part of the optical region of the spectrum, generally extending from 0.7 to 1.7 microns. The fibers comprise a core and a cladding, with the cladding having an index of refraction lower, at least in part, than that of an index of refraction associated with the core. Such low loss optical fibers are formed of glass comprising primarily silica, i.e. the glass composition comprises more than 50% silica.

Dopants which are used to make optical fibers include germania, an index raising dopant, which is the principal and most widely used dopant, as well as other minor dopants, such as phosphorus, and other index raising dopants, and fluorine and boron, index lowering dopants. Other dopants considered for use in optical fibers include Al, Zr, Nb, Ta, Ga, In, Sn, Sb, Bi, the 4f rare earths (atomic numbers 57-71), and the alkaline earths Be, Mg, Ca, Zn, Sr, Cd, and Ba. Of these, certain rare earth-doped optical fibers are of interest for a variety of applications including fiber lasers, attenuators and sensors.

Optical fibers are normally made by the oxidation of metal chlorides. Chlorides are conventionally used because they can be vaporized at relatively low temperatures and delivered to a hot zone where they are oxidized. By "hot zone" is meant that region of a glass preform forming apparatus where glass forming reactant vapors are oxidized; it can include, for example, a region within a burner flame or a heated region within a substrate tube. Vaporization techniques typically used for silicon tetrachloride and germanium tetrachloride include bubbling, direct vaporization and flash vaporization. Other chlorides that have been used commercially include boron and phosphorus chlorides which are also liquid or gaseous at room temperature.

There are however several other metal chlorides that could be used in optical waveguides that are solids at room temperature and may or may not sublime rather than boil. These properties make it nearly impossible to deliver these materials with conventional systems. Reactants for forming such other metal oxides have been formed by vaporization of the metal chloride (U.S. Pats. Nos. 3,801,294, 4,604,118 and 4,787,927) and by reaction of a halide such as chlorine with the dopant metal to form a chloride that is delivered to the hot zone through a heated injection tube (U.S. Pat. No. 4,616,901).

In the MCVD process (U.S. Pat. No. 4,217,027), silica and/or doped silica particles are formed in the 1800° C. hot zone; they then flow downstream where they deposit on the tube wall. Although a relatively short time is required for sintering each layer of particles, typical sintering temperatures are 1800° C. Since each layer is separately sintered in the MCVD process, all previously applied layers are subjected to temperatures on the order of 1800° C. during the sintering of each subsequently deposited layer. U.S. Pat. No. 4,616,901 points out the tendency of the nonglass forming refractory oxides to crystallize if given sufficient time, at sufficiently elevated temperatures. To prevent devitrification of silica fibers containing dopants such as alumina and zirconia, that patent teaches that an effective amount of phosphorus oxide can be added to the core glass during the manufacture of the silica preforms. Optical fibers having silica cores doped with $Al_2O_3$ and $P_2O_5$ and having numerical apertures of 0.16 and 0.27, exhibited minimum losses of 2 dB/km and 8 dB/km, respectively, at 1.15 $\mu$m. These losses were considered to be relatively low, partly because of the reduced tendency of the ternary $Al_2O_3$-$P_2O_5$-$SiO_2$ glass system to devitrify. However, for certain purposes, the incorporation of $P_2O_5$ in the core of an optical fiber is undesirable.

The flame hydrolysis process is similar to the MCVD process in that the glass particles are subjected to relatively high temperatures during the particle formation and deposition stage of the process. In the flame hydrolysis process (U.S. Pat. No. Re. 28,029) silica and/or doped silica particles that are formed in a high temperature flame are deposited on a temporary mandrel, and the deposited particles are subjected to elevated temperatures during the immediately subsequent traverses of the particle-generating flame along the preform. The mandrel is removed, and the resultant porous tubular preform is sintered to a clear glass tube at about 1450° C. Optical fibers having silica cores doped with 18 wt. % $GeO_2$, 1.5 wt. % $Al_2O_3$ and 800 ppm Er were formed by the flame hydrolysis process, all reactants being delivered to the burner as chlorides. These optical fibers exhibited minimum attenuations between 5 and 10 dB/km at wavelengths between 1300 and 1550 nm.

Various techniques have been developed for incorporating dopants into porous tubular flame hydrolysis-produced preforms after the preform deposition stage; see for example, U.S. Pats. Nos. 3,859,073 and 4,263,031, both to P. C. Schultz. Such dopants are therefore spared the high temperatures encountered during the initial preform formation process.

In accordance with the teachings of U.S. Pat. No. 3,859,073, a porous preform formed by the flame hydrolysis process is cooled and then immersed in a solution containing a dopant. The porous preform is dried and heat treated to consolidate or sinter it into a non-porous glass body containing the dopant. Solution doping techniques are time consuming in that they require the steps of immersion and drying in addition to the conventionally performed steps of deposition and consolidation. Moreover, porous preforms have often been rendered useless due to either disintegration during immersion in the solvent or cracking of the outer layers of the preforms during drying. Larger preforms, which are preferred for use in commercial operations, exhibit a greater tendency to fracture during immersion.

U.S. Pat. No. 4,263,031 teaches a method of flowing a dopant chloride into the aperture of a porous tubular preform while the preform is in the consolidation furnace. The dopant chlorides disclosed in that patent are the aforementioned conventional chlorides such as chlorides of germanium, phosphorus, titanium, which can be vaporized at relatively low temperatures and delivered from a source such as a bubbler. Chlorides of metals such as aluminum, zirconium and the like, which can be supplied through a heated delivery system to an MCVD substrate tube in accordance with the teachings of U.S. Pat. No. 4,616,901, cannot similarly be delivered to a porous preform disposed in a consolidation furnace.

The system for delivering gas to the aperture of a preform in a consolidation furnace would need to be heated before it is inserted into the consolidation furnace to prevent condensation of the dopant chloride Such consolidation furnace delivery tubes are not easily provided with heating means. Furthermore, part of the delivery tube is subjected to consolidation temperatures (around 1450° C.) which would adversely affect conventional heating tapes.

SUMMARY OF THE INVENTION

It is therefore an object of the present invention to provide a method and apparatus for introducing into a tubular, porous glass optical fiber preform more than trace amounts of certain dopants such as rare earth oxides, alumina, zirconia and the like, which are not easily incorporated into the glass during its initial formation. Another object is to provide a method of making optical fibers that exhibit low loss even though they contain dopants that would normally tend to crystallize. A further object is to provide an extremely simple and inexpensive process for incorporating certain dopants in at least the central region of a tubular, porous glass preform.

One aspect of the invention concerns a method of making a glass article. A porous glass preform having interconnective pores and an aperture is heated in a furnace. The heat from the furnace is also used to heat one or more dopants. A gas is flowed over and reacts with the dopant to form a reactant vapor that flows into the aperture and into the pores of the preform. The porous glass preform is heated to consolidate it into a non-porous glass body which at least in part contains the dopant. Thereafter, an optical fiber can be formed from the glass body.

Another aspect of the invention concerns an apparatus for incorporating the dopant into the tubular porous glass preform. The apparatus comprises a gas conducting handle attached to the preform, and dopant chamber means in the handle for supporting the dopant. The dopant chamber means can comprise a restriction of reduced diameter in the handle, and means adjacent the restriction for preventing the dopant from falling through the restriction. The dopant chamber means can be located in an insert tube that is located within the handle.

The apparatus can further comprise means for heating the handle and preform, and means for flowing a gas into the handle, through the dopant chamber means, and into the preform aperture, whereby gas that reacts with the dopant forms a reaction product that flows into and dopes the preform. The means for heating can comprise a consolidation furnace having preform support means and a gas conducting tube, a first end of which is situated within the consolidation furnace. The handle is affixed to the support means, and the first end of the gas conducting tube is situated in gas transferable relationship with the handle.

The disclosed technique, which can be performed in any suitable consolidation furnace, is especially advantageous in that it requires no modification of the apparatus that forms the porous preform and very little modification to standard preform consolidation equipment.

The method of this invention is especially suitable for imparting special properties to an already formed or deposited optical fiber core preform.

BRIEF DESCRIPTION OF THE DRAWINGS

FIGS. 1 and 2 illustrate the application of successive coatings of glass particles to a mandrel.

FIG. 3 is a schematic illustration of an apparatus for doping a tubular porous preform.

FIG. 6 is a schematic diagram illustrating the drawing of a rod from the consolidated preform.

FIG. 7 illustrates the application of a coating of cladding glass particles to the rod produced by the method of FIG. 6.

FIGS. 8 and 10 are spectral attenuation curves for silica fibers doped with erbium and aluminum.

FIG. 9 is a graph of the weight percent dopant deposited in the glass as a function of the weight of dopant employed.

DESCRIPTION OF THE PREFERRED EMBODIMENTS

Figure 4:
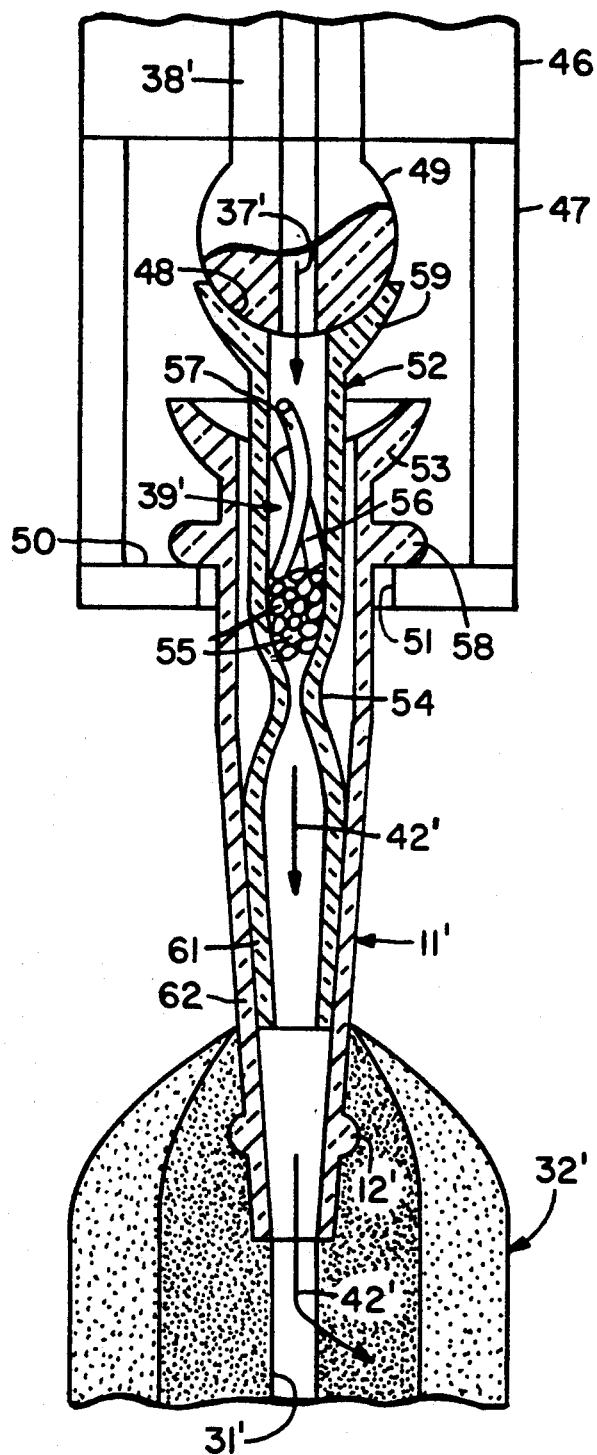
FIGS. 4 and 5 are cross-sectional views of preform supporting handles containing dopant chambers.

The present method pertains to the treatment of a tubular porous preform in a consolidation furnace whereby it is dried, doped and consolidated. These steps result in the formation of a non-porous glass body which contains, at least in part, the dopant supplied in the consolidation furnace. The glass body is usually in the form of a cylinder which can be drawn directly into an optical fiber or which can be provided with additional material to form a draw blank that can be drawn into a fiber. The cylinder could be a tube into which a rod of core glass is inserted, or it could be formed into a rod of core glass that is provided with cladding material in the form of a glass tube or glass particles that are consolidated to form a cladding glass coating.

The tubular porous preform is conventionally formed by depositing particles on a mandrel and then removing the mandrel. The particle deposition step can take the form of any process whereby heated glass particles are deposited to form an aggregation or deposit of particles that adhere together to form a tubular, porous glass coating having interconnective pores. To form optical fibers, the base glass is preferably $SiO_2$. Certain dopants such as $GeO_2$, $P_2O_5$, $B_2O_3$ and the like can be incorporated in the base glass particles during the particle deposition step to raise or lower the refractive index of the particles with respect to that of $SiO_2$.

In the embodiment shown in FIGS. 1 and 2, an optical fiber core blank is formed by a method similar to that disclosed in U.S. Pat. 4,486,212 (Berkey) which is incorporated herein by reference. Referring to FIG. 1, the large diameter end of a tapered mandrel 10 is inserted into glass tube 11 having protrusions 12. Shims (not shown) can be used to secure tube 11 to mandrel 10 as disclosed in U.S. Pat. 4,289,517. Mandrel 10 is rotated and translated with respect to a burner 13 of the type disclosed in U.S. Pat. 4,165,223. Reactant compounds emanate from the burner where they are oxidized in the flame to form glass particle stream 22 which is directed toward mandrel 10. Auxiliary burners 23 direct flames toward the ends of the porous glass preform during deposition; the use of auxiliary burners is taught in U.S. Pat. 4,810,276 (Gilliland).

The method of this invention advantageously incorporates into an optical fiber a dopant such as a rare earth, alumina or the like that is difficult to incorporate into the porous preform during the soot deposition process. Such dopant is omitted from the initially formed porous core preform 32 which is formed by simply depositing on mandrel 10 a coating 28 of core glass particles that can be doped with a refractive index increasing dopant such as $GeO_2$ or the like. If an index-increasing dopant is employed during the formation of coating 28, it is advantageous to also deposit a coating 29 of cladding glass particles on the surface of coating 28 as shown in FIGS. 1 and 2. Each of the coatings 28 and 29 is formed by traversing the mandrel a number of times with respect to burner 13 to cause a build-up of a plurality of layers of glass particles.

Preform 32 is removed from the lathe, and the mandrel is removed through tube 11, thereby leaving a longitudinal aperture 31 in the porous preform. Protrusions 12 cause tube 11 to adhere to the preform; that tube supports the preform during subsequent processing.

Referring to FIG. 3, porous preform 32 is shown suspended in the muffle 33 of a consolidation furnace, examples of which are disclosed in U.S. Pats. Nos. 4,165,223 and 4,741,748. The scanning consolidation furnace disclosed in U.S. Pat. No. 4,741,748 is advantageous in that one source of heat in the preform is generated by a coil that scans along the preform. A sharp hot zone can be generated by slowly traversing the coil along the preform; alternatively, the preform can be isothermally heated by rapidly reciprocating the coil. Moreover, the temperature of a scanning consolidation furnace is readily adjustable.

Muffle gas (arrows 36) is fed to the bottom of muffle 33. A drying gas mixture (arrow 37), usually chlorine and an inert gas such as helium, is delivered by supply tube 38. In accordance with this invention, a dopant chamber 39 is situated such that dopant material in that chamber is contacted by drying gas from tube 38.

Whereas chamber 39 is illustrated as being a discrete component, it could be any region that is conducive to supporting one or more pieces of dopant. For example, a piece of dopant foil could be folded or crumpled into a shape that could be wedged in tube 11 or at the top of aperture 31. It is noted that aperture 31 is tapered such that it is larger at its end near support tube 11. This tapered shape can assist in the temporary retention of the dopant at or near the top of the preform aperture. Since the dopant is subjected to preform drying temperature in the consolidation furnace, it is quickly dissipated soon after it begins to react with the chlorine. Although placing the dopant in the preform aperture may result in nonuniform doping along the length of the preform, the major portion of the preform should be suitable for its intended purpose. If discrete devices are being made from the preform, extremely large numbers of such devices can be made from only a fraction of the preform.

Codoping can be practiced by employing more than one dopant compound in chamber 39. Since the dopant source is situated within the consolidation furnace, it is at an elevated temperature when it is contacted by the heated drying gas, which is usually chlorine. A portion of the chlorine reacts with dopant material in chamber 39 to form reaction products such as dopant chlorides. The amount of chlorine that is normally employed for drying the porous preform is adequate to both dry the preform and transport the metal dopant from chamber 39 to the preform. The resultant mixture (arrows 42) of drying and doping gases flows into aperture 31 and at least a portion of those gases flows outwardly through the interconnected pores. This method is advantageous in that the reaction of chlorine with the dopant source to form dopant chloride vapors occurs at a temperature that is significantly lower than that temperature which would be required to vaporize a source of the chloride form of the dopant. After the porous preform is doped and dried, it is fused or consolidated to form a non-porous glass body in which the dopant is at least in part dispersed. A plug such as silica capillary tube 43 can be placed in the bottom of aperture 31 to provide a back-pressure that aids the drying process. This can prevent or reduce the burnout of a refractive index increasing dopant such as $GeO_2$ when such a dopant is present in coating 28.

The ratio of the radius of core portion 28 to $a_o$, the radius of cladding portion 29, is referred to as the core/clad ratio of the preform. Under circumstances such as those set forth in the later described examples, the dopant that is added to the preform in conjunction with the consolidation step extends to a radius $a_d$ of about 8 mm into the porous preform, the overall preform diameter being 95 mm. If the optical fiber is to be employed as a discrete fiber amplifier, the length of which is usually about 1 to 30 meters, the rare earth dopant preferably extends throughout the entire core and can even extend into the cladding. To obtain doping of the entire core in such a process, the core/clad ratio of the flame hydrolysis produced preform should be in the range of about 0.14–0.18.

A distributed fiber amplifier, wherein the rare earth dopant extends the entire length of the transmission fiber, can be formed by doping the entire core with a smaller concentration of the rare earth dopant or by doping only the inner portion of the fiber core.

In the manufacture of Er-doped fiber amplifiers, $Al_2O_3$ is often added to the fiber core to modify the output gain spectrum. Up to about 1 wt. % $Al_2O_3$ is normally used since any amount in excess of 1 wt. % causes no further effect.

FIG. 4, wherein elements similar to those of FIG. 3 are represented by primed reference numerals, illustrates the manner in which dopant chamber 39' can be incorporated into the handle of a preform consolidation apparatus. The dopant chamber is situated within an insert tube 52 that is supported in handle 11' (shown in greater detail in this figure). The insert tube contains a constriction 54 that supports pieces 55 of high temperature material such as refractory beads and/or chunks. Pieces 55 consist of a material such as silica which does not vaporize or react with drying gas 37' at temperatures to which it is subjected in the consolidation furnace. That region of insert tube 52 above silica pieces 55 constitutes chamber 39' into which pieces 56 and 57 of dopant material are placed. Below constriction 54 is a tapered end 61 which fits snuggly into a correspondingly tapered region of handle 11'. The mating regions of handle 11' and insert tube 52 have ground glass surfaces that form a gas tight connection.

Handle 11' is supported in the furnace muffle by a support tube 46 which has a slotted base 50 at the lower end thereof. One side of end region 47 of tube 46 is removed to accept the upper end of handle 11', support collar 58 resting on slotted base 50 as the adjacent section of handle 11' is inserted into slot 51. At the end of gas conducting tube 38' is a ball joint 49 which fits into cavity 48 of joint 59.

As preform 32' is lowered into the consolidation furnace muffle, drying gas mixture 37' is delivered by supply tube 38' to dopant chamber 39'. A portion of drying gas 37' reacts with pieces 56 and 57 of dopant material. The resultant gas mixture 42' flows between silica pieces 55, through tube 11' and into preform aperture 31'.

Figure 5:
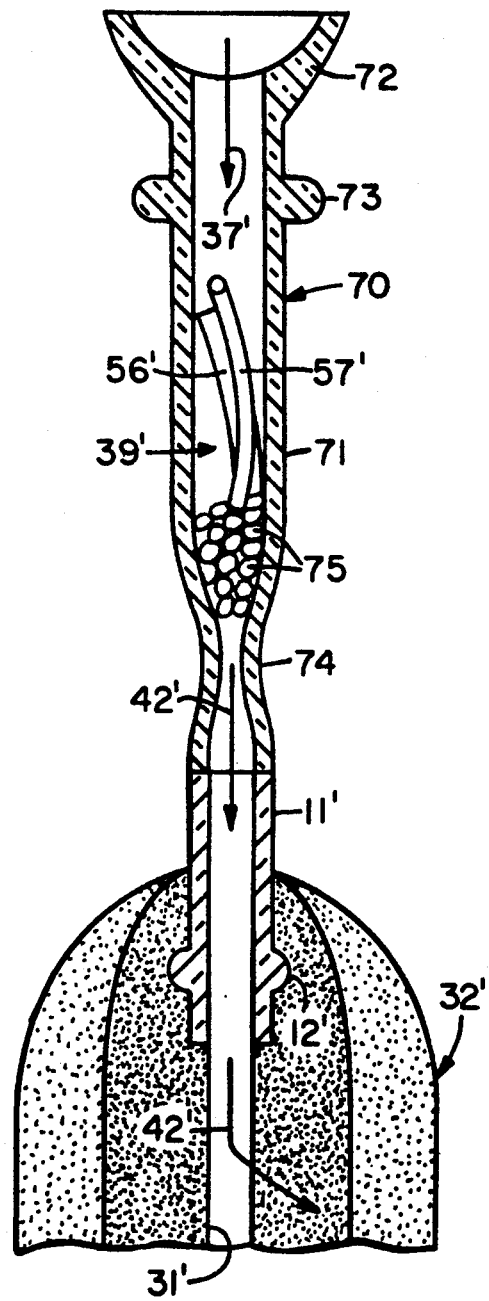

In the modification shown in FIG. 5, elements similar to those of FIG. 4 are represented by primed reference numerals. The end of tube 11' is fused to gas-conducting handle 70 which comprises glass tube 71 having a flared joint 72 at its upper end and a collar 73. Constriction 74 supports refractory pieces 75. Dopant pieces 56' and 57' are located in chamber 39'. In this embodiment, tube 11' is merely a short length of tube that is fused to the end of handle 70.

The consolidated preform can be drawn directly into an optical fiber if the ratio of the radius of the core glass region to the overall radius is adequate to provide the desired fiber core diameter. Alternatively, the consolidated preform can be provided with additional cladding material prior to drawing the optical fiber. In a preferred embodiment, consolidated preform 80 is inserted into the apparatus of FIG. 6 where one end of silica rod 83 is fused to the lower end of the preform, and the other end of the rod is engaged by motor-driven tractors 84. As the lower end of the preform is pulled downwardly, its diameter decreases, evacuated aperture 81 collapses, and rod 85 is drawn.

If the embodiment of FIG. 4 is employed, insert tube 52 is removed after the doping/consolidation step, and the ball joint connection of the vacuum applying tube is mated with flared joint 53 of handle 11'. The embodiment of FIG. 4 is advantageous for the following reason. In some instances, a gaseous etchant is flowed into the aperture of a consolidated preform to remove imperfections or to improve the dopant profile if, for example, an undesirable decrease in the centerline dopant concentration has occurred during processing. The etchant can damage joint 59 to the extent that the required vacuum cannot be applied to the preform in the stretching step of FIG. 6. By removing the damaged insert tube after completion of the consolidation step, flared joint 53 is available for making a gas tight seal to the ball joint of the vacuum system.

A plurality of sections 88 are severed from rod 85, and each section 88 (FIG. 7) is supported in a lathe where it functions as a mandrel for the deposition of additional cladding glass particles 89. The resultant composite preform 90 is inserted into a consolidation furnace muffle where it is dehydrated and consolidated to form a draw blank that is drawn into an optical fiber.

The following examples illustrate the manner in which the method of the present invention can be employed to incorporate rare earth oxides into the cores of optical fibers.

EXAMPLE 1

A discrete fiber amplifier was made as follows.

Alumina mandrel 10 (FIG. 1) was inserted into glass tube 11' (FIG. 4). The outside diameter of the mandrel tapered from 5.5 mm to 6.5 mm over its 107 cm length. The ends of mandrel 10 were mounted in a lathe where it was rotated and translated with respect to burner 13. The burner-to-mandrel spacing was 11.5 cm. The burner traversed a 50 cm section of mandrel 10 in 25 seconds. Auxiliary burners 23 directed flames toward the ends of the porous glass preform during deposition. Liquid $SiCl_4$ was maintained at 40° C. in a first container, and liquid $GeCl_4$ was maintained at 37° C. in second container, thus producing vapor at about 20 psi.

During the deposition of coatings 28 and 29 (FIGS. 1 and 2), vapors were metered from the first and second containers and were premixed with oxygen before being supplied to the reactant orifice of burner 13.

An acetylene torch was initially supported on the burner; the torch traversed the mandrel to deposit carbon particles on it to facilitate removal of the porous preform. Coating 28 of silica glass particles doped with 18 wt. % $GeO_2$ was deposited by flowing $SiCl_4$ to burner 13 at the rate of 1.0 slpm (standard liters per minute) for 45 minutes, while $GeCl_4$ flowed to the burner at a rate of 0.65 slpm. Coating 29 was formed by flowing only 1.0 slpm $SiCl_4$ to the burner for the last 300 minutes of the run. The preform was cooled, and the mandrel was removed through tube 11. The resultant porous preform 32 was 50 cm long, 95 mm in diameter, its core/clad ratio was 0.17 and its average density was about 0.38 g./cm$^3$.

Chunks 55 of silica were placed in insert tube 52 adjacent to restriction 54 (FIG. 4). Pieces 56 and 57 of erbium and aluminum weighing 0.25 g and 0.3 g, respectively, were inserted into the chamber 39' above silica pieces 55. The erbium was obtained by cutting a tiny piece from a sheet of erbium foil having a thickness of 0.25 mm. The aluminum was obtained by cutting about ten 1.5 cm lengths from 0.5 mm diameter aluminum wire. The insert tube was placed inside the handle 11' which was then loaded into a scanning consolidation furnace (FIG. 3) where it was dried, doped and consolidated.

During the drying and doping step, a movable induction coil was reciprocated back and forth along the length of the preform at a rate of 1800 mm/minute to isothermally increase its temperature from room temperature to about 1025° C. A drying gas mixture consisting of 50 sccm chlorine and 700 sccm helium flowed through tube 38' and into chamber 39'. The chlorine reacted with the pieces of erbium ribbon and aluminum wire to form chlorides that flowed into the axial aperture 31'. While the temperature remained at about 1025° C., the gas mixture continued to flow for 20 minutes to dry and dope the preform. During this step, a muffle gas consisting of 20 slpm helium flowed upwardly from the bottom of the muffle.

The porous preform was then consolidated to form a dense glass tube by traversing the coil upwardly along the preform at a rate of 12 mm/minute to generate in the preform a sharp hot zone, the maximum temperature of which was about 1440° C. Thirty minutes after initiation of the consolidation step, the flow of drying gas mixture 37 was discontinued. The muffle gas continued to flow during the entire consolidation step.

Insert tube 52 was removed, and the consolidated preform was placed in a draw furnace. Its aperture was evacuated by connecting the ball joint of the vacuum line to flared joint 53. The lower end of the tubular body was heated to 1900° C. and drawn at a rate of about 15 cm/min to for, a 5 mm solid glass core rod which was severed to form sections. One of the sections was supported in a lathe where it functioned as a mandrel upon which $SiO_2$ cladding soot was deposited to an outside diameter of 95 mm. The resultant final porous preform was consolidated to form a draw blank. During the consolidation process, a gas mixture containing 40 slpm helium and 0.5 slpm chlorine flowed through the muffle. The draw blank was placed in a draw furnace where its tip was heated to about 2100° C., and a fiber having an outside diameter of 125 μm was drawn. The fiber was coated with a 250 μm diameter urethane acrylate coating during drawing. The core radius was 1.9 μm. The average concentration of $Er_2O_3$ in the Er-doped region of the fiber was 800 ppm; that region also contained 0.8 wt. % $Al_2O_3$ FIG. 8 shows the spectral attenuation curve for that fiber.

FIG. 9 shows the relationship between the weight of dopant employed in chamber 39 and the concentration of dopant incorporated in the preform for conditions similar to those set forth in Example 1. Since all of the dopant in the chamber is reacted and carried to the porous preform, the total weight of the dopant employed in the chamber determines the maximum concentration of dopant in the consolidated preform. More than 800 ppm Er and more than 0.8 wt % $Al_2O_3$ could be incorporated into the glass, but these were the maximum amounts that were needed to form particular optical fiber amplifiers. It is thought that the temperature to which the dopant is heated determines the duration of the doping step and that the flow rate of the chlorine drying gas and the density of the porous preform determine the radius to which the dopant penetrates.

EXAMPLE 2

Except for differences specified below, a process similar to Example 1 was used to form a distributed fiber amplifier. A core preform was formed by a process similar to that disclosed in U.S. Pat. No. 4,715,679, whereby its core had a central triangularly-shaped region ($SiO_2$ doped with a maximum $GeO_2$ concentration of 16.8 wt. %), a silica ring, a ring of $SiO_2$ doped with 4 wt. % $GeO_2$ and a sufficient thickness of $SiO_2$ cladding to provide a core/clad ratio of 0.4. This was the standard core preform used for forming a commercial optical fiber having low dispersion at 1550 nm. Dopant chamber 39' was loaded with 0.006 g erbium foil and 0.24 g aluminum wire. The core of the resultant fiber contained about 1 ppm erbium and 0.6 wt. % $Al_2O_3$.

The spectral attenuation curve for the fiber is shown in FIG. 10. The 0.39 dB/km attenuation at 1300 nm is essentially as good as a $GeO_2$-doped commercial fiber that does not contain erbium and alumina.

EXAMPLE 3

Except for differences specified below, a process similar to Example 1 was used to form a Yb-doped absorbing fiber suitable for use in conjunction with an erbium-doped fiber amplifier.

A 70 cm long porous preform having an outside diameter of 100 mm and an average density of about 0.4 g/cc was deposited as follows. $SiCl_4$ flowed to the burner at rate of 2.4 slpm during a 390 minute period. During the first 156 minutes of that period, $GeCl_4$ flowed at 0.7 slpm to form coating 28, which consisted of $SiO_2$ doped with 9 wt. % $GeO_2$. The $SiO_2$ coating 29 was deposited during the last 234 minutes of the run.

The resultant porous preform was inserted into a consolidation furnace muffle as in Example 1. A drying gas mixture containing 0.7 slpm helium and 50 sccm chlorine flowed over a 0.4 g piece of 0.25 mm thick Yb foil to form the dopant chloride.

The consolidated preform was stretched to form a 5 mm solid glass core rod which was severed to form sections. One section was coated with $SiO_2$ cladding soot to an outside diameter of 90 mm. The resultant final porous preform was consolidated as described above.

The draw blank was drawn to form a fiber having a 125 μm outside diameter that was provided with a 250 μm diameter urethane acrylate coating. The core diameter was 8.5 μm.

The attenuation of the fiber was several hundred dB/km at 980 nm and 0.24 dB/km at 1550 nm, whereby the fiber was suitable for use as an attenuator of 980 nm pump light.

I claim:

1. A method of making a glass article comprising the steps of
    forming a porous glass preform having interconnective pores and an aperature therethrough and thereafter,
    heating said preform in a furnace,
    using the heat from said furnace to heat a dopant source,
    flowing over said heated dopant source a gas that reacts with said dopant source to form a reactant vapor that flows into said aperture and thereafter into said pores, and
    heat treating the porous glass preform to consolidate it into a non-porous glass body which at least in part contains said dopant.

2. The method of claim 1 wherein the step of flowing comprises forming a metal halide-containing vapor by passing a halogen gas over at least one solid piece of dopant selected from the group consisting of Al, Zr, Nb, Ta, Ga, In, Sn, Sb, Bi, the 4f rare earths (atomic numbers 57–71), and the alkaline earths Be, Mg, Ca, Zn, Sr, Cd and Ba.

3. The method of claim 1 wherein said dopant is located in said preform aperture.

4. The method of claim 1 wherein the step of using comprises heating said dopant in a chamber that is in fluid flow connection with said aperture.

5. The method of claim 4 wherein the step of heat treating said preform comprises supporting a tubular porous glass preform in said furnace by a gas-conducting handle in which said dopant containing chamber is located.

6. The method of claim 4 wherein the step of heat treating said preform comprises supporting a tubular porous glass preform in said furnace by a gas-conducting handle containing a removable insert in which said dopant containing chamber is located.

7. The method of claim 6 wherein both said handle and said insert are provided with gas connection means.

8. The method of claim 4 wherein said chamber contains a plurality of dopants.

9. A method of making a glass optical fiber comprising
    depositing heated glass particles on a mandrel where they adhere together to form an elongated porous glass preform having interconnective pores,
    removing said mandrel to form an aperture through said porous preform,
    suspending said preform in a consolidation furnace by a gas conducting handle containing a dopant chamber in which a dopant source is disposed,
    heating said handle and preform,
    flowing through said dopant chamber a gas that reacts with the heated dopant to form a reactant vapor that flows into said aperture and into said pores, whereby said dopant is incorporated into the porous glass preform,
    heat treating the porous glass preform to consolidate it into a non-porous glass body containing the dopant dispersed throughout at least a portion of the body, and forming an optical fiber from said glass body.

10. The method of claim 9 wherein the step of depositing comprises introducing reactant vapors into a flame where they are oxidized to form glass particles which are directed onto said mandrel where they form a first coating of core glass particles having a first refractive index and thereafter, a second coating of cladding glass particles having a second refractive index lower than said first refractive index, the combination of said first and second coatings constituting said porous glass preform.

11. The method of claim 10 wherein the step of forming comprises stretching said non-porous glass body to decrease its diameter, thereby forming a rod, depositing additional cladding glass particles on said rod, consolidating said additional cladding glass particles, and drawing the resultant composite into a fiber.

12. The method of claim 2 wherein said dopant is located in said preform aperture.

13. The method of claim 2 wherein the step of using comprises heating said dopant in a chamber that is in fluid flow connection with said aperture.

14. The method of claim 13 wherein the step of heat treating said preform comprises supporting a tubular porous glass preform in said furnace by a gas-conducting handle in which said dopant containing chamber is located.

15. The method of claim 13 wherein the step of heat treating said preform comprises supporting a tubular porous glass preform in said furnace by a gas-conducting handle containing a removable insert in which said dopant containing chamber is located.

16. The method of claim 1 wherein the step of heat treating said preform comprises supporting a tubular porous glass preform in said furnace by a gas-conducting handle having a restriction of reduced diameter and means adjacent said restriction for preventing said dopant source from falling through said restriction.

17. The method of claim 1 wherein the step of heat treating said preform comprises supporting a tubular porous glass preform in said furnace by a gas-conducting handle containing an insert tube having a restriction of reduced diameter and means adjacent said restriction for preventing said dopant source from falling through said restriction.

18. A method of making a glass article comprising the steps of forming a porous glass preform having interconnective pores and an aperture therethrough and thereafter, heating said preform in a furnace, using the heat from said furnace to heat a dopant source selected from the group consisting of Al, Zr, Nb, Ta, Ga, In, Sn, Sb, Bi, the 4f rare earths (atomic numbers 57-71), and the alkaline earths Be, Mg, Ca, Zn, Sr, Cd and Ba, flowing a halogen gas over said heated dopant source a gas that reacts with said dopant source to form a reactant vapor that flows into said aperture and thereafter into said pores, supporting a tubular porous glass preform in said furnace by a gas-conducting handle in which said dopant containing chamber is located, and heat treating the porous glass preform to consolidate it into a non-porous glass body which at least in part contains said dopant.

19. The method of claim 18 wherein said halogen gas is chlorine.

* * * * *